United States Patent [19]

Cheeseman

[11] Patent Number: 5,309,287
[45] Date of Patent: May 3, 1994

[54] SCREW - THREAD ARRANGEMENT

[76] Inventor: Alan R. Cheeseman, 9, Alex Grierson Close, Binley, Coventry, England, CV3 2QJ

[21] Appl. No.: 968,000
[22] PCT Filed: Apr. 25, 1991
[86] PCT No.: PCT/GB91/00658
§ 371 Date: Oct. 26, 1992
§ 102(e) Date: Oct. 26, 1992
[87] PCT Pub. No.: WO91/16661
PCT Pub. Date: Oct. 31, 1991

[30] Foreign Application Priority Data

Apr. 26, 1990 [GB] United Kingdom ............... 9009344

[51] Int. Cl.$^5$ .................................. G02B 7/02
[52] U.S. Cl. ............................. 359/829; 359/823; 359/827; 354/295
[58] Field of Search ............... 359/819, 822, 823, 825, 359/826, 827, 829, 830, 694, 699, 700; 354/295, 296

[56] References Cited

U.S. PATENT DOCUMENTS

| | | | |
|---|---|---|---|
| 4,506,952 | 3/1985 | Grollimund | 358/823 |
| 4,707,083 | 11/1987 | Iizuka et al. | 359/823 |
| 4,898,453 | 2/1990 | Hohenecker | 359/822 |
| 4,989,950 | 2/1991 | Nakauchi | 359/827 |

FOREIGN PATENT DOCUMENTS

| | | |
|---|---|---|
| 0333637 | 9/1989 | European Pat. Off. . |
| 58-118612 | 7/1983 | Japan . |

OTHER PUBLICATIONS

N. P. Chironis "Mechanism, linkages and mechanical control" 1965, McGraw-Hill, New York US, pp. 188-189.

*Primary Examiner*—Loha Ben
*Attorney, Agent, or Firm*—Frijouf, Rust & Pyle

[57] ABSTRACT

A conversion arrangement for mounting optical units on a camera such as a film or television camera has a generally cylindrical mounting body (12, 14) for attachments to the camera body, a generally cylindrical carrier (B) for attachment to the optical unit, the carrier being coaxially coupled to the mounting body for axle movement relative to the mounting body, and a focusing ring (22) which is co-axial with and coupled to both the mounting body (12, 14) and the carrier (B). The focusing ring is rotatable relative to the mounting body and carrier to move the carrier axially off the mounting body to focus the optical unit. Backlash during focusing is reduced to negligible proportions by use of a screw-thread arrangement in which a screw-thread is formed on a radially inner wall of the focusing ring by means of a wire coil (44), the pitch of the wire coil being set by end members (46) and gapped rings (48) acting as spacers between the turns of the wire coil. Several followers (30) are supported on the carrier and engage with the wire coil so that rotation of the focusing ring winds the followers and therefore the carriage axially along the focusing ring in order to effect focusing. This screw-thread arrangement avoids the need for very precise machining of the screw-threads on the focusing ring (22) and carrier (B) and provides for simple replacement of the followers (30) in the event of wear or damage.

34 Claims, 2 Drawing Sheets

SCREW - THREAD ARRANGEMENT

BACKGROUND OF THE INVENTION

The present invention relates to a screw-thread arrangement, and to a conversion arrangement for mounting optical units on cameras, particularly though not exclusively on film or television cameras.

Accordingly, the present invention provides a screw-thread arrangement for enabling two coaxial members to be rotated relative to one another to move the members axially one relative to another, the arrangement comprising:

a screw-thread formed on a radial surface of a first of the members and radially spaced from a second of the members;

a plurality of follower positioned between the co-axial members and supported on the second of the members; and means biasing the followers into engagement with the screwthread to cause the followers to follow the screw-thread on relative rotation of the members to move the members axially relative to one another.

BRIEF DESCRIPTION OF THE DRAWINGS

The present invention is further described hereinafter by way of example, with reference to the accompanying drawings in which.

DESCRIPTION OF THE PREFERRED EMBODIMENT

Figure 1:
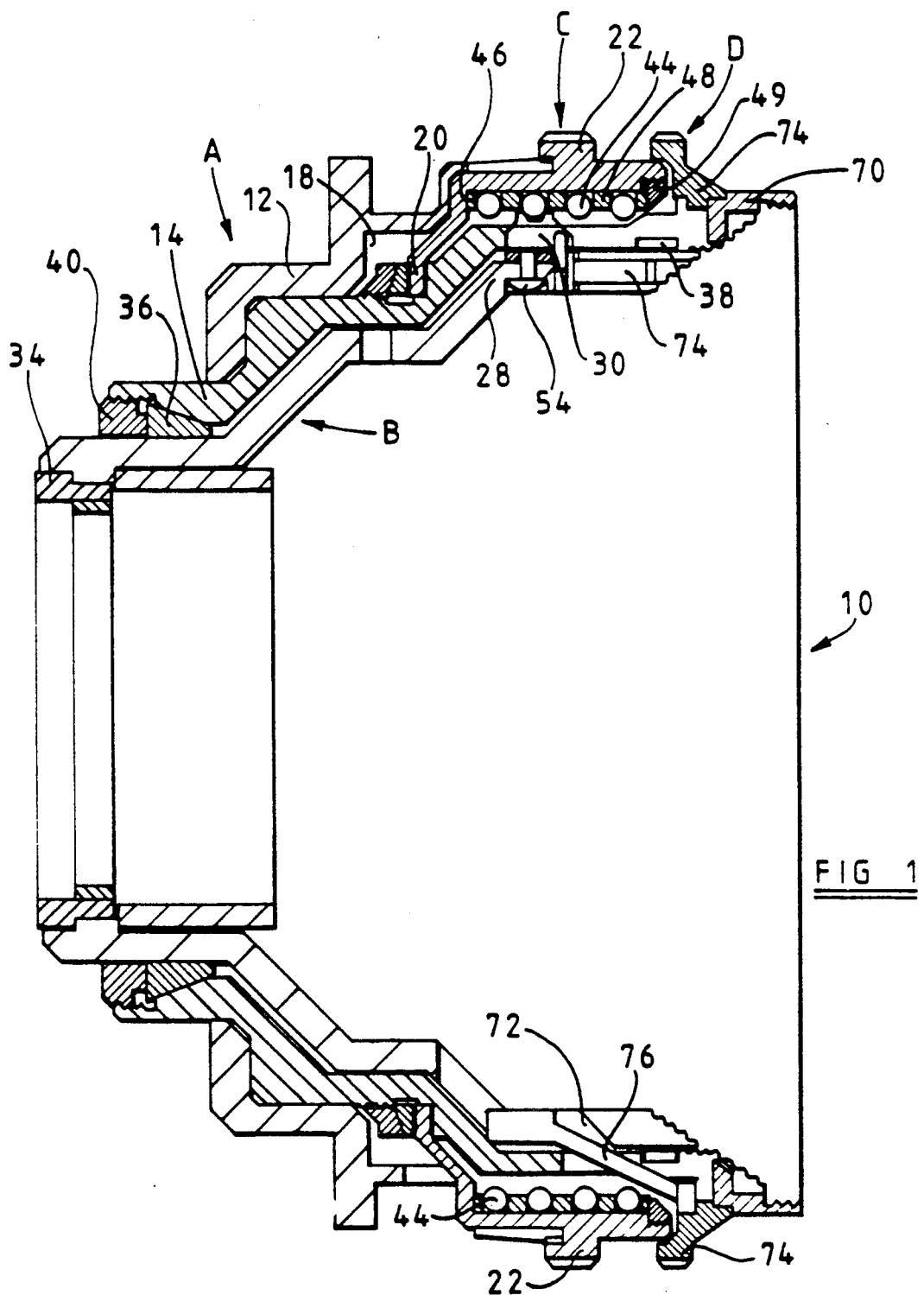
FIG. 1 is a longitudinal section through a conversion arrangement for an optical unit for use with a camera, the arrangement incorporating a screw-thread arrangement according to one embodiment of the present invention, with certain parts omitted for clarity.
Figure 2:
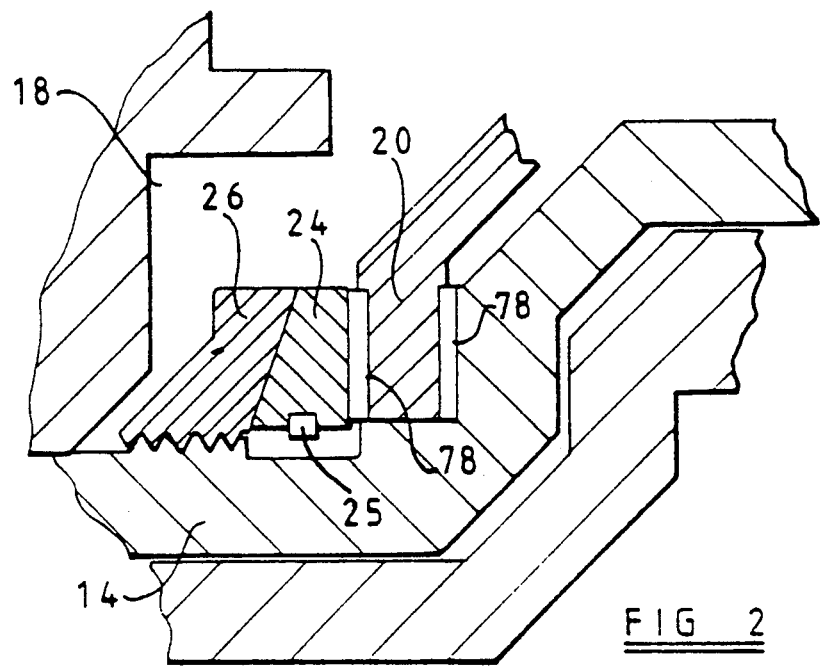
FIG. 2 is an enlarged sectional view of a first portion of the arrangement of FIG. 1.

Referring now to the drawing, this shows a section through a conversion arrangement 10 which is intended for use with various types of optical unit. The conversion arrangement enables the optical unit to be mounted on to a camera such as a film or television camera. The conversion arrangement is fitted within the camera body, which is to the left as seen in the drawing, whilst the optical unit is contained within the conversion arrangement, facing to the right.

The conversion arrangement 10 comprises a mounting means or member A, a carrier or optical unit support B, a focusing gear C, and an iris drive gear D.

The mounting member A is dimensioned so as to fit on the front of a camera body and has a mounting adaptor 12 of suitable form and a mounting body 14. The adaptor 12 engages with the mounting arrangement on the camera to secure the conversion arrangement 10 in position. The mounting body also has an annular recess 18 which opens axially away from the camera body to receive a radially inwardly extending flange 20 of a focusing ring 22 of the focusing gear. The flange 20 is formed at the camera body end of the focusing ring 22 and is retained in the recess 18 by the action of a thrust ring 24 and retaining ring 26, this being described further below.

The optical unit is contained in the support B and is secured by a locking ring 34. The optical unit support B is coaxially mounted within the mounting member A so as to be axially slidable relative thereto but is prevented from rotating relative to the mounting member A. The optical unit support B is located in the mounting body 14 by a support bearing 36 at the rear, left hand end of the conversion arrangement 10 as seen in the drawing, and by a support ring 38 at the front of the arrangement 10. Both rings 34, 38 are adjustable, the ring 38 being adjustable by means of three equi-angularly spaced screws (not shown) and the ring 36 being adjustable by means of a clamp ring 40. The latter has a radially outer screw-thread which engages a screw-thread formed on a radially inner surface of the mounting body 14, enabling the clamp ring 40 to be screwed axially of the mounting body. The support bearing 36 has a radially outer frusto-conical bearing surface which bears on a correspondingly shaped radially inner surface of the mounting body 14.

The focusing ring 22, during manufacture of the arrangement 10, is provided with a cylindrical internal bore 42. An internal screw-thread, or camtrack, is then provided by means of stainless steel wire 44 which is formed into a coil on the inner surface of the bore 42. The pitch of the thread is controlled by two end shoe plates 46 and pitch shims 48 with the assembly being held in place by a clamp ring 49. The shoe plates are generally annular, each having a respective axially inwardly directed surface 50 which is machined or contoured to the desired pitch helix, together with an end-stop to abut the wire ends. Each pitch shim 48 is conveniently in the form of a split ring which fits between turns of the wire to ensure a uniform spacing between turns. The wire 44 may conveniently be formed in 1, 2 or more lengths. The wire is conveniently made from stainless steel or other suitable resilient material and the coil of wire has a Bree or "rest" diameter which is slightly greater than that of the surface 42 so that the wire coil resides radially outwardly against the focusing ring. The wire may form a single or multi-start thread.

An annular extension 28 of the optical unit support B supports two followers or movement segments 30 (FIG. 3) which are generally 180 degrees apart. The arrangement of each movement segment 30 is the same and therefore only one of the movement segments is described below in detail. It will be appreciated that more than two such segments may be used.

Figure 3:
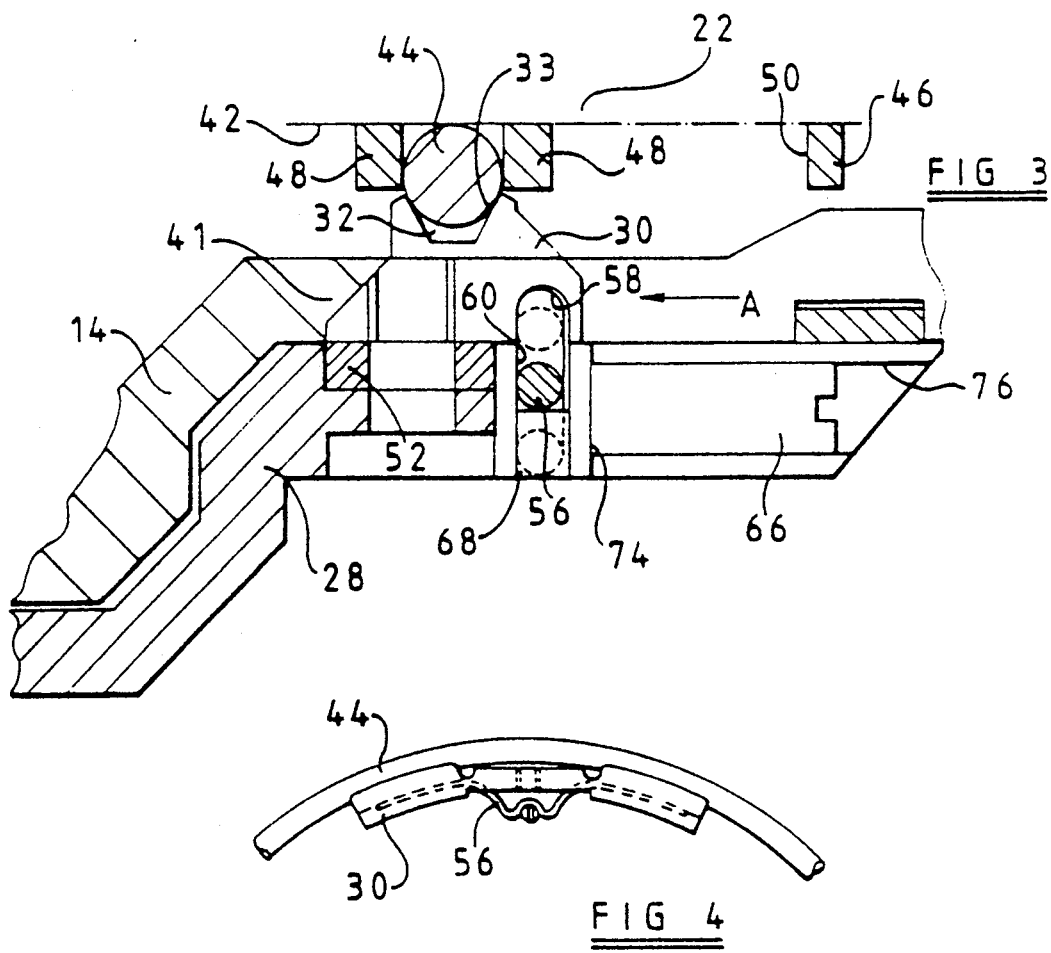
FIG. 3 is an enlarged sectional view of a second portion of the arrangement of FIG. 1.
Figure 4:
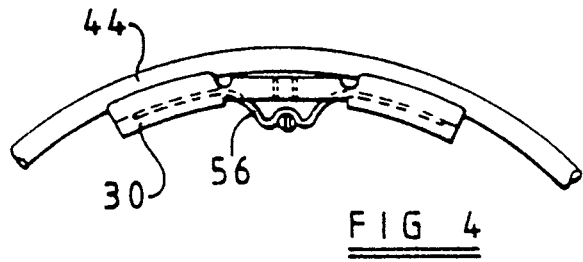
FIG. 4 is a view in the direction of arrow A of FIG. 3 with certain parts omitted for clarity.

The movement segment 30 is generally arcuate in length and has a groove 32 of generally U-section (e.g. part circular cross section) formed on its radially outer surface, the groove being dimensioned to receive part of the circumference of the wire 44 as can be seen in the drawing. As is shown in FIG. 3 the groove 32 has two side walls 33 which taper away from one another outwardly of the groove.

The inner diameter of each shim 48 and shoe plate 46 is arranged to be slightly less than the fitted centre line diameter of the wire 44. This is to ensure that the wire, shims, and shoe plates are correctly retained when the clamp ring 49 is tightened. The outer radial diameter of the movement segment 30 is slightly less than the inner diameters of the shims 48 and shoe plates 46. The movement segment 30 contacts the wire 44 on its side walls (conveniently machined at 30 degrees to the vertical centreline) at contact points on the wire which are conveniently at 90 degrees to each other. The contacting side walls extend just beyond the points of contact with the wire 44. The groove 32 has substantially the same radius of curvature about the axis of the bore 42 as the wire 44 in order to provide a firm and positive engagement but, in a preferred form, the movement segment 30 contacts the wire only at or near its extreme ends.

The movement segment 30 is supported on the annular extension 28 of the optical unit support B in a suitable slot or opening 41 formed in the mounting body 14, preventing rotational movement of the movement segment about the axis of the arrangement when the focusing ring is rotated. During assembly of the arrangement the initial radial position of the movement segment 30 is set by one or more shim washers 52 which are secured in position in a groove or recess in the optical unit support B by means of one or more screws 54.

Further biasing of the movement segment 30 into positive engagement with the wire 44 is effected by a wire spring 56 which locates in facing grooves or slots 58, 60 in the radially inner surface of the movement segment 30 and in the annular extension 28. The spring bias which the spring 56 applies to the movement segment 30 is adjusted by means of a cam pin 74 which locates in an axial slot 76 of the extension 28. The slot 76 is generally cylindrical to accommodate a cylindrical shank 66 of the cam pin 74, the shank carrying an eccentrically mounted cam 68 at one end which acts on the spring 56.

As can be seen from FIG. 3 the shank 66 has a slot provided at its opposite end by means of which the cam pin can be rotated to rotate the eccentrically mounted cam 68 and increase or decrease the biasing force of the spring 56 on the movement segment 30. Such adjustment may be performed during assembly of the arrangement or subsequently by a user since access to the cam pin is from the front of the arrangement and does not require removal of any parts other than a lens cap. As will be appreciated, the fine adjustment of the spring biasing is conveniently used to provide the desired torque of focusing movement, i.e. light or heavy or somewhere in between. The spring biasing also compensates for wear which may occur in the movement segment or wire 44.

As will be appreciated, because the optical unit support B is prevented from rotating relative to the mounting body 14, rotation of the focusing ring 22, causes the optical unit support B to move axially Of the camera body which is secured to the adaptor 12. The very positive engagement of the movement segments 30 with the focusing ring 22 eliminates any backlash in the relative movement of the focusing ring and the optical unit support B and therefore in focusing of the optical unit.

In a modification (not shown in the drawings) each movement segment 30 may be supported on a pivotal bearing allowing the segment to pivot laterally in the direction of the axis of the arrangement. The pivotal bearing may be in the form of a radial pin secured to the annular extension 28 and extending into a hole or bore in the centre of the movement segment 30. This allows the movement segment 30 freely to follow the wire 44 and also enables the pitch of the wire coils to be varied along the bore 42 of the focusing ring 22. This variation in pitch can be achieved by gradually increasing the thickness of the pitch shims 48. The movement segment 30 may conveniently be made of plastics material.

It will be appreciated that the movement segments can be used with normal, machined screw-threads on the inner surface of the focusing ring 22 which has the advantages of providing automatic wear compensation to avoid backlash.

The radially inner flange 20 of the focusing ring 22 is maintained in engagement with the mounting body 14 by the thrust ring 24 and retaining ring 26. The thrust ring is provided with a gap and has its surface facing the retaining ring 26 machined at a preselected angle with the abutting surf ace of the retaining ring 26 machined at the same angle. This angle lies in the range substantially 55 degrees to 80 degrees and preferably 70 degrees to the axis of the focusing ring.

The thrust ring 24 is retained between the radial flange 20 of the focusing ring 22 and the retaining ring 26, the latter being screwed onto a cylindrical extension of the mounting body 14 which forms a wall of the recess 18. Rotation of the focusing ring 22 and therefore the flange 20 causes the thrust ring to contract very slightly, the abutting surfaces of the thrust ring 24 and retaining ring 26 sliding relative to one another. This slight contraction of the thrust ring 24 allows smooth rotation of the focusing ring 22 without introducing any axial play in the focusing ring 22 relative to the mounting body 14. However, once rotation ceases, the thrust ring 24 resides into its rest position, thus providing a very positive location of the flange 20 and therefore of the optical unit support B whilst avoiding introducing any backlash between the focusing ring 22 and the mounting body 14 and therefore in focusing of the optical unit. To assist smooth rotation of the focusing ring 22, PTFE washers 78 may be inserted between the flange 20 and thrust ring 24 and between the flange 20 and the mounting body 14.

The position of the retaining ring 26 can also be adjusted to provide the desired torque of focusing movement, i.e. light or heavy or somewhere in between.

It will also be appreciated that the design and operation of the thrust ring 24 automatically provides compensation for any wear which might take place in the thrust ring itself.

Although the thrust ring 24 is preferably of resilient material, a circlip 25 may conveniently be provided in an annular groove in a radially inner surface of the thrust ring 24 in order to assist in biasing the latter into firm engagement with the flange 20 and retaining ring 26.

The radially inner surface of the flange 20 of the focusing ring 22 is machined to a close tolerance to bear against the surface of the mounting body 14 and prevent any radial play in the ring 22.

In an alternative embodiment, the thrust ring 24 is replaced by a plurality of arcuate segments which are held in a generally circular arrangement by a circlip. Each wedge may be provided with a groove in its surface abutting the retaining ring 26 which engages with a corresponding peg or projection on the retaining ring 26 to allow radial movement of each arcuate segment but to prevent any angular movement about the axis of the mechanism.

The focusing ring 22 is provided with gear teeth on a radially outer surface to enable the ring to be rotated by the camera focusing drive.

The iris drive gear D is independent of the focusing gear C. In practice, the iris actuating mechanism is generally located towards the rear of an optical unit. Therefore, since the iris drive is positioned well into the body of the camera whilst the iris drive gear D is placed towards the front of the conversion arrangement 10, a remote connection is required between the two.

The iris drive gear D has an iris movement gear 74 which is provided on a radially outer surface with gear teeth to enable the gear to be rotatably driven by the camera iris drive. The gear 74 rotates on a closely machined diameter on the mounting body 14, axial displacement of the iris gear being controlled for example by a flange at the rear and a front piece ring 70 at the front.

A bracket 76 is secured at one end to the iris gear 74 whilst its other end engages in an axial slot machined in an iris carriage (not shown) of the arrangement.

Port holes 72 arranged in the mounting body 14 and optical unit support B allow access for the bracket 76 to operate the iris carriage and thus the iris in the optical unit, over the full working range of the optical unit.

Rotary movement of the iris gear 74 can therefore be transmitted to the iris of the optical unit via the bracket 76 and iris carriage without it being affected by any movement of the focusing ring 22 or movement of the optical unit support B.

It will be appreciated that although the screw-thread arrangement using the wire coil 44 is described above with reference to a camera lens conversion arrangement, it is not restricted to such use. In addition, the wire 44 may be of circular, square or any other suitable cross-section.

The wire 44 may also form a screw-thread in a conical, tapered or varying diameter bore or on a correspondingly shaped outer surface.

The biasing force of the follower biasing means bore spring may be adjusted by means of a tapered screw in place of the adjusting cam pin 74.

In place of the end stop means 46 and spacer means 48, a groove may be machined in the bore of the first member or focusing ring 22, in which the wire 44 sits.

I claim:

1. A screw-thread arrangement for enabling two coaxial members (22,B) to be rotated relative to one another to move said members axially one relative to another, the arrangement comprising:
   a screw-thread (44) formed or a radial surface of a first of said members (22,B) and radially spaced front a second of said members;
   a plurality of followers (30) positioned between said coaxial members and supported on Baid second of said members; and
   means (56) biasing said followers into engagement with said screw-thread to cause said followers to follow said screw-thread on relative rotation of said members to involve said members axially relative to one another.

2. An arrangement as claimed in claim 1 wherein each said follower (30) is elongate and has longitudinal groove means (32) for engaging said screw-thread.

3. An arrangement as claimed in claim 1 wherein each of said followers engages said screw-thread at or adjacent the ends of said follower.

4. An arrangement as claimed in claim 1 wherein each of said followers is of substantially arcuate shape in length.

5. An arrangement as claimed in claim 1 wherein each of said followers is supported on said second member for pivotal movement axially of said second member for enabling said follower freely to flow said screw-thread.

6. An arrangement as claimed in claim 5 wherein each of said followers is pivotally mounted on said second member at a mid point of said follower.

7. An arrangement as claimed in claim 1 further comprising means for adjusting the biasing force of said biasing means.

8. An arrangement as claimed in claim 1 wherein said biasing means comprises spring means located between said second member and each of said followers to urge said follower into engagement with said screw-thread.

9. An arrangement as claimed in claim 8 wherein said spring means is a wire spring.

10. An arrangement as claimed in claim 1 wherein each of said followers is formed of plastic material.

11. An arrangement as claimed in claim 1 wherein said followers are equiangularly spaced about said second member.

12. An arrangement as claimed in claim 1 wherein said screwthread is formed by a wire coil secured to a radial surface of said first member.

13. An arrangement as claimed in claim 12 wherein said wire coil has a rest diameter relative to the diameter of said radial surface of said first member such that said wire coil resides against said radial surface.

14. An arrangement as claimed in claim 12 further comprising spacer means between adjacent turns of said wire coil for maintaining a preselected pitch for said wire coil.

15. An arrangement as claimed in claim 14 further comprising a respective end stop means at each end of said wire coil, each end stop means having a lateral surface abutting said wire coil shaped to set the pitch of said wire coil.

16. An arrangement as claimed in claim 15 wherein each said end stop means is substantially annular.

17. An arrangement as claimed in claim 14 wherein each said spacer means is formed by a split ring.

18. An arrangement as claimed in claim 12 wherein said wire coil is electrically conductive end is covered with an electrical insulator.

19. An arrangement as claimed in claim 1 wherein said screw-thread is formed by at least two wire coils interwound to provide a multi-start screw-thread.

20. An arrangement as claimed in claim 1 wherein said screw-thread is formed on a radially inner surface of said first member and said followers are supported on a radially outer surface of said second member.

21. A conversion arrangement for coupling an optical unit to a camera body, the conversion arrangement comprising:
   a mounting means for attachment to the camera body;
   a generally cylindrical carrier for attachment to said optical unit, said carrier being coaxially coupled to said mounting means for axial movement relative thereto; a focusing ring coaxial with and coupled to said mounting means and said carrier for rotation relative thereto wherein rotation of said focusing ring causes said carrier to move axially of said mounting means for focusing said optical unit;
   a screw-thread arrangement as claimed in claim 1 wherein one of said focusing ring and said carrier comprises said first member and the other of said focusing ring and said carrier comprises said second member; and
   means inhibiting axial movement of said focusing ring relative to said mounting means.

22. A conversion arrangement as claimed in claim 21 wherein said focusing ring comprises said first member and said carrier comprises said second member.

23. A conversion arrangement as claimed in claim 21 wherein said inhibiting means comprises second biasing means for biasing said focusing ring towards said mounting means and means for adjusting said biasing means.

24. A conversion arrangement as claimed in claim 23 wherein said adjusting means comprises retaining means for axially retaining said second biasing means between said retaining means and a portion of said focusing ring.

25. A conversion arrangement as claimed in claim 24 wherein said portion of said focusing ring is a radially directed flange.

26. A conversion arrangement as claimed in claim 23 wherein said second biasing means is displaceable between a first position wherein said second biasing means firmly retains said focusing ring against axial movement relative to said mounting means and a second position wherein a biasing force of said second biasing means is reduced to facilitate rotation of said focusing ring whilst retaining said ring against said axial movement, said second biasing means being displaceable from said first position to said second position in response to rotation of said focusing ring and from said second position to said first position in response to cessation of rotation of said focusing ring.

27. A conversion arrangement as claimed in claim 26 wherein said second biasing means and said adjusting means have abutting, wedge-shaped surfaces inclined at a preselected angle to the rotational axis of said focusing ring such that movement of said adjusting means towards said focusing ring urges said second biasing means radially of said axis against a return force.

28. A conversion arrangement as claimed in claim 27 wherein said preselected angle is in the range of substantially 55 to 80 degrees.

29. A conversion arrangement as claimed in claim 28 wherein said preselected angle is substantially 70 degrees to said axis.

30. A conversion arrangement as claimed in claim 27 wherein said second biasing means is a gapped ring of a material dimensioned such that said ring resides radially of said axis away from said first and second positions towards a rest position.

31. A conversion arrangement as claimed in claim 27 further comprising circlip means coaxial with said second biasing means for urging said second biasing means radially of the axis of said focusing ring towards said first position.

32. A conversion arrangement as claimed in claim 27 wherein said second biasing means comprises a plurality of arcuate members and circlip means coaxial with said arcuate members for urging said members radially of the axis of said focusing ring towards said first position.

33. A conversion arrangement as claimed in claim 26 wherein said first position is radially outwardly of said second position.

34. A conversion arrangement as claimed in claim 21 further comprising an iris drive gear coaxial with said mounting means so as to be rotatable relative thereto for preselecting a desired aperture of an iris of said optical unit, said iris drive gear being connectable to an iris actuating mechanism in said optical unit and an iris drive in said camera body to enable actuation of said iris adjusting mechanism by said iris drive.

* * * * *